United States Patent
Yeager et al.

(10) Patent No.: US 9,053,638 B2
(45) Date of Patent: Jun. 9, 2015

(54) UNMANNED VEHICLE SIMULATION SYSTEM

(75) Inventors: Matthew R. Yeager, Centreville, VA (US); John A. Wheeler, Centreville, VA (US); Christopher J. Hecht, Fairfax, VA (US); Brian A. Adams, Fairfax, VA (US)

(73) Assignee: Raytheon Company, Waltham, MA (US)

( * ) Notice: Subject to any disclaimer, the term of this patent is extended or adjusted under 35 U.S.C. 154(b) by 2207 days.

(21) Appl. No.: 11/929,657

(22) Filed: Oct. 30, 2007

(65) Prior Publication Data

US 2009/0112388 A1    Apr. 30, 2009

(51) Int. Cl.
| | |
|---|---|
| G05D 1/00 | (2006.01) |
| G09B 9/00 | (2006.01) |
| G09B 9/02 | (2006.01) |
| G09B 19/16 | (2006.01) |

(52) U.S. Cl.
CPC .. G09B 9/00 (2013.01); G09B 9/02 (2013.01); G09B 19/16 (2013.01)

(58) Field of Classification Search
CPC .......... B64C 2201/146; B64C 39/024; G05D 2201/0209
USPC ..................... 701/23; 370/400.466
See application file for complete search history.

(56) References Cited

U.S. PATENT DOCUMENTS

| | | | | |
|---|---|---|---|---|
| 2003/0146290 | A1* | 8/2003 | Wang et al. ................ | 236/49.3 |
| 2006/0077998 | A1* | 4/2006 | Fredriksson ................ | 370/466 |
| 2006/0085106 | A1* | 4/2006 | Gaudiano et al. ............. | 701/23 |
| 2006/0184456 | A1* | 8/2006 | de Janasz ................... | 705/72 |
| 2006/0271248 | A1* | 11/2006 | Cosgrove et al. ............. | 701/2 |
| 2007/0271079 | A1* | 11/2007 | Oguchi et al. ................ | 703/8 |

FOREIGN PATENT DOCUMENTS

| | | |
|---|---|---|
| CA | 2700805 C | 8/2014 |
| CN | 101842821 A | 9/2010 |
| CN | 101842821 B | 4/2014 |
| JP | 2005-164416 | 6/2005 |
| JP | 2007-189610 | 7/2007 |
| JP | 2007-189610 A | 7/2007 |
| WO | WO-2009-058698 A2 | 5/2009 |

OTHER PUBLICATIONS

"Army Training Fails to Address 'Enormity of the Urban Problem'," Showdaily, I/ITSEC, 16 pages, Dec. 8, 2004.

(Continued)

*Primary Examiner* — Redhwan k Mawari
*Assistant Examiner* — Rodney P King
(74) *Attorney, Agent, or Firm* — Schwegman Lundberg & Woessner, P.A.

(57) ABSTRACT

According to one embodiment, an unmanned vehicle simulation system includes a simulator translator coupled between an unmanned vehicle control system that is operable to control an unmanned vehicle and a vehicle simulator that is operable to simulate operation of the unmanned vehicle. The simulator translator is operable to receive a message from the unmanned vehicle control system, translate the message to another message suitable for use by the vehicle simulator, and transmit the translated message to the vehicle simulator.

20 Claims, 1 Drawing Sheet

(56) References Cited

OTHER PUBLICATIONS

Dobbelstein, "Stimulation zur Unterstutzung bei Einfuhrung und Nutzung von UAVs," CAE Elektronik GmbH, XP-002538118, 28 pages, [not translated], Apr. 2007.
McGarity, "Simulation Across the UAV Life Cycle—Lessons Learnt," XP-002538128, 5 pages, 2005.
PCT Notification of Transmittal of the International Search Report and the Written Opinion of the International Searching Authority, International Application No. PCT/US2008/081250, 13 pages, Feb. 9, 2009.
Translation of an Office Action of Japan Patent Office, Application No. 2010-531308, 4 pages, Mailed Sep. 20, 2011.
Patent Abstract of Japan, Publication No. 2007-189610, Jul. 26, 2007, 1 page.
Patent Abstract of Japan, Publication No. 2005-164416, Jun. 23, 2005, 1 page.
"Australian Application Serial No. 2008318930, Response filed Nov. 14, 2012 to First Examiner's Report dated Apr. 3, 2012", 14 pgs.
"Australian Application Serial No. 2008318930, Examiner's First Report mailed Apr. 3, 2012", 2 pgs.
"Canadian Application Serial No. 2,700,805, Office Action mailed Mar. 13, 2013", 2 pgs.
"Canadian Application Serial No. 2,700,805, Office Action mailed May 29, 2012", 2 pgs.
"Canadian Application Serial No. 2,700,805, Response filed Sep. 5, 2013 to Office Action mailed Mar. 13, 2013", 5 pgs.
"Canadian Application Serial No. 2,700,805, Response filed Oct. 25, 2012 to Office Action mailed May 29, 2012", 13 pgs.
"Chinese Application Serial No. 200880114232.2, Office Action mailed May 27, 2013", (w/ English Translation), 7 pgs.
"Chinese Application Serial No. 200880114232.2, Office Action mailed Oct. 31, 2012", (w/ English Translation), 7 pgs.
"Chinese Application Serial No. 200880114232.2, Office Action mailed Dec. 7, 2011", (w/ English Translation), 9 pgs.
"Chinese Application Serial No. 200880114232.2, Response filed Jan. 15, 2013 to Office Action mailed Oct. 31, 2012", (w/ English Translation of Claims), 11 pgs.
"Chinese Application Serial No. 200880114232.2, Response filed Apr. 23, 2012 to Office Action mailed Dec. 7, 2011", (w/ English Translation of Claims), 14 pgs.
"Chinese Application Serial No. 200880114232.2, Response filed Aug. 12, 2013 to Office Action mailed May 27, 2013", (w/ English Translation of Claims),10 pgs.
"Essential Innovation", Showdaily I/ITSEC 2004, [online]. Retrieved from the Internet <http://www.t2net.org/downloads/briefs/news/day3_2004.pdf>, (Dec. 8, 2004), 1-16.
"European Application Serial No. 08844151.4, Examination Notification Art. 94(3) mailed Jul. 23-14", 6 pgs.
"Israeil Application Serial No. 204656, Office Action mailed Jun. 16, 2014", (English Transalation), 3 pgs.
"Japanese Application Serial No. 2010-531308, Examiners Decision of Final Refusal mailed Jun. 5, 2012", (with English Translation), 4 pgs.
"Japanese Application Serial No. 2010-531308, Respons filed Mar. 12, 2012 to Office Action mailed Sep. 20, 2011", 9 pgs.
McGarity, Michael, "Simulation Across the UAV Life Cycle—Lessons Learnt", (2005), 1-5.

\* cited by examiner

UNMANNED VEHICLE SIMULATION SYSTEM

TECHNICAL FIELD OF THE DISCLOSURE

This disclosure generally relates to unmanned vehicles, and more particularly, to an unmanned vehicle simulation system and method of operating the same.

BACKGROUND OF THE DISCLOSURE

Unmanned vehicles generally refer to particular types of vehicles that operate without the use of an onboard pilot or driver. Types of unmanned vehicles may include aircraft that fly through the air, ground vehicles that travel over the surface of the Earth, or boats that move over the water. These unmanned vehicles may provide benefit over manned vehicles in that they may be used where direct human involvement is not needed or desired, such as, for example, in military confrontations, or other hazardous environments that may not be suitable for human habitation.

SUMMARY OF THE DISCLOSURE

According to one embodiment, an unmanned vehicle simulation system includes a simulator translator coupled between an unmanned vehicle control system that is operable to control an unmanned vehicle and a vehicle simulator that is operable to simulate operation of the unmanned vehicle. The simulator translator is operable to receive a message from the unmanned vehicle control system, translate the message to another message suitable for use by the vehicle simulator, and transmit the translated message to the vehicle simulator.

Some embodiments of the disclosure may provide numerous technical advantages. Some embodiments may benefit from some, none, or all of these advantages. For example, one embodiment of the unmanned vehicle message simulation system may alleviate costs associated with development of simulation tools for unmanned vehicle control systems. The unmanned vehicle simulation system uses a commercially available off-the-shelf (COTS) vehicle simulator having built-in vehicle models for simulating operation of various types of unmanned vehicles with a relatively high degree of accuracy. Use of the commercially available off-the-shelf vehicle simulator alleviates the need for generation of vehicle models and/or relatively complicated algorithms that use these models to enable simulated operation of the unmanned vehicle.

Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Control of an unmanned vehicle is typically provided by a remotely configured unmanned vehicle control system that communicates with the unmanned vehicle through a wireless radio-frequency (RF) link. The unmanned vehicle control system may be configured to simultaneously administer control of a number of unmanned vehicles. To promote interoperability among a number of differing types of unmanned vehicles through a common user interface, a STANdardization AGreement (STANAG) 4586 specification has been implemented.

The STANdardization AGreement 4586 specification generally defines a protocol for communication of unmanned vehicle control systems with various types of unmanned vehicles. Each of these unmanned vehicles, however, may have performance characteristics that differ from one another. These differing performance characteristics may pose problems for implementation of new unmanned vehicles with existing unmanned vehicle control systems.

To facilitate development of new unmanned vehicles for use with existing unmanned vehicle control systems, simulation tools have been developed. These known simulation tools, however, may not accurately simulate the performance characteristics of an actual unmanned vehicle to a sufficient degree. In many cases, development costs for generation of models that simulate the performance characteristics to a sufficient degree may be cost prohibitive.

Figure 1:
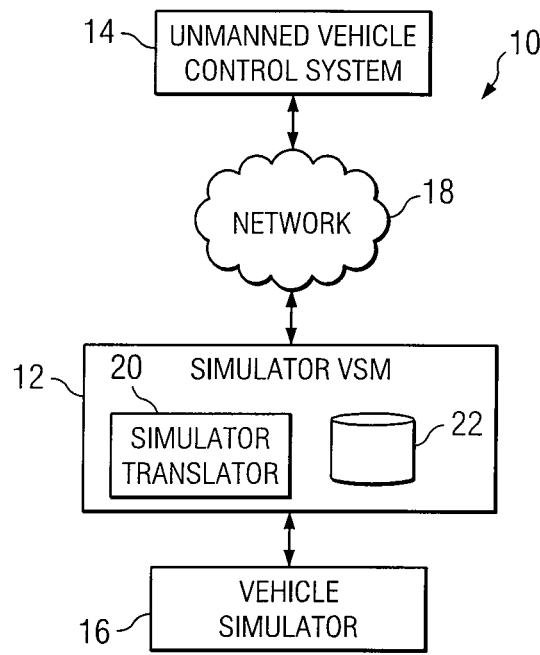
FIG. 1 is a block diagram of one embodiment of an unmanned vehicle simulation system according to the teachings of the present disclosure.

FIG. 1 shows one embodiment of an unmanned vehicle simulation system 10 that may provide a solution to this problem as well as other problems. Unmanned vehicle simulation system 10 generally includes a simulator vehicle specific module 12 coupled between an unmanned vehicle control system 14 and a vehicle simulator 16. In this particular embodiment, unmanned vehicle control system 14 is a core unmanned aerial vehicle control system (CUCS) that communicates with the simulator vehicle specific module 12 using a STANdardization AGreement 4586 compliant protocol through user datagram protocol (UDP) network 18. According to the teachings of the present disclosure, simulator vehicle specific module 12 may include a simulator translator 20 that is operable to translate messages generated by unmanned vehicle control system 14 into a protocol suitable for communication with vehicle simulator 16. Using this configuration, the vehicle simulator 16 may be operable to simulate the performance characteristics of an actual unmanned vehicle with unmanned vehicle control system 14.

The vehicle simulator 16 may be any suitable computer executable program that is configured to receive control messages and simulate movement of an actual unmanned vehicle in response to these messages. In one embodiment, vehicle simulator 16 is a commercially available off-the-shelf (COTS) product configured with a number of vehicle models for relatively accurate simulation of various types of actual vehicles. In one embodiment, vehicle simulator 16 is a FlightGear computer executable program, which is freely available using a General Public license (GPL). The FlightGear executable program enables remote control of simulated vehicles through an Ethernet port using a telnet protocol. In one embodiment, this Ethernet port may be coupled to the simulator vehicle specific module 12 for transmission and receipt of messages using the telnet protocol.

The commercially available off-the-shelf vehicle simulator 16 may provide models that simulate behavior of an actual unmanned vehicle in a relatively realistic manner. In one embodiment, each of these models may be modified in order to further enhance the accuracy of simulation. A vehicle model may generally refer to a group of run-time variables that are stored in a memory and accessed by one or more simulation algorithms in the vehicle simulator 16. The vehicle simulator 16 may use these run-time variables for simulation of various performance characteristics of a particular vehicle. For example, one vehicle model may include a maximum thrust rating of a jet engine configured on a particular aircraft. During simulation, this maximum thrust rating may be used to provide relatively accurate simulation of various differing performance characteristics of the aircraft such as, climb rate, take-off speed, maximum cruise speed, and the like. In one embodiment, the run-time variables of a particular vehicle model may be editable so that the vehicle model may be tailored to simulate one particular type of unmanned vehicle in a relatively accurate manner.

Certain embodiments incorporating a commercially available off-the-shelf product may provide an advantage in that costs for simulated testing of new unmanned vehicles with an existing unmanned vehicle control system 14 may be reduced. Development of dedicated simulation tools for each new unmanned vehicle implemented in an existing unmanned vehicle control system 14 may be relatively high. In one respect, this may be due to relatively complex algorithms that simulate unmanned vehicles in various types of environments. The commercially available off-the-shelf vehicle simulator 16 therefore, may provide a reduction in costs by alleviating dedicated software development of vehicle models and associated computer executed algorithms that execute these models on a computer.

The simulator vehicle specific module 12 may be implemented with a processor executing computer instructions stored in a memory. In the particular embodiment shown, simulator vehicle specific module 12 may be coupled to an unmanned vehicle control system 14 that is in turn, coupled to a number of other vehicle specific modules (not specifically shown) through network 18. In this configuration, simulation of a new unmanned vehicle may be tested for interoperability with a number of other unmanned vehicles simultaneously with unmanned vehicle control system 14.

The simulator vehicle specific module 12 may enable communication of various types of messages, such as control messages that control movement of the simulated unmanned vehicle between unmanned vehicle control system 14 and vehicle simulator 16. These control messages may include requests to change direction, change speed, and/or may include geospatial information, such as global positioning system (GPS) coordinates that instruct the simulated unmanned vehicle to proceed to a specified location. These control messages may also include requests to control other peripheral devices configured on the simulated unmanned vehicle, such as armament, cameras, or other surveillance devices.

The simulator vehicle specific module 12 may provide translation of messages that originate at the vehicle simulator 16 and destined for the unmanned vehicle control system 14. Messages generated by the vehicle simulator 16 may include, for example, telemetry information, or graphical information of the simulated vehicle's environment, such as video information provided by one or more cameras. Telemetry information generated by the vehicle simulator 16 may include information regarding the status of the simulated unmanned vehicle, such as fuel level or other measurements of the ambient environment, such as temperature, wind speed, wind direction, or humidity.

In one embodiment, the simulator vehicle specific module 12 may include a storage medium 22 for storage of messages transmitted between the simulator vehicle specific module 12 and vehicle simulator 16. Following a simulated mission of a particular simulated unmanned vehicle, the messages stored in storage medium 22 may be analyzed to determine if proper messages and responses to these messages were translated through the simulator vehicle specific module 12. Storage medium 22 may be any suitable type of memory for storage of messages in computer readable format and may include any one or combination of memory elements, such as random access memory (RAM), tape, compact disc read only memory (CD-ROM), disk, diskette, cartridge, or the like. In one embodiment, storage medium 22 may include a logfile that sequentially stores each message transferred through the simulator vehicle specific module 12. In this manner, the timing of messages and their response messages may also be analyzed for proper operation.

Figure 2:
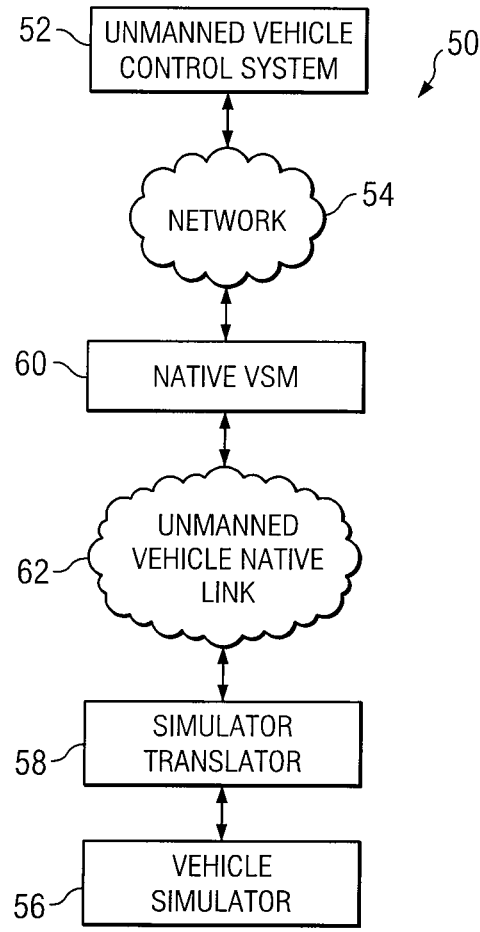
FIG. 2 is a block diagram of another embodiment of an unmanned vehicle control system.

FIG. 2 shows another embodiment of an unmanned vehicle simulation system 50 that may be implemented for simulation of unmanned vehicles. Unmanned vehicle simulation system 50 includes a unmanned vehicle control system 52, a network 54, and a vehicle simulator 56 that is similar in design and purpose to unmanned vehicle control system 14, network 18, and vehicle simulator 16 of FIG. 1, respectively. Unmanned vehicle simulation system 50 differs from unmanned vehicle simulation system 10 of FIG. 1, however, in that a simulator translator 58 is provided for translating messages from a native vehicle specific module 60 into a protocol suitable for communication with the vehicle simulator 56 and vice-versa. In this manner, proper operation of native vehicle specific module 60 may be verified for proper operation with the unmanned vehicle control system 52. Native vehicle specific module 60 generally refers to a type of vehicle specific module that is configured to enable communication of unmanned vehicle control system 52 with an actual unmanned vehicle.

The simulator translator 58 may be implemented with a processor executing computer instructions stored in a memory. In one embodiment, the simulator translator 58 may communicate with the vehicle simulator 56 using an Ethernet link utilizing a telnet protocol. The simulator translator 58 may enable communication of various types of messages between unmanned vehicle control system 52 and vehicle simulator 56 in a manner similar to the simulator vehicle specific module 12 of FIG. 1.

The native vehicle specific module 60 may provide any number of services for enabling control of an actual unmanned vehicle using unmanned vehicle control system 52. These services may include, for example, translation of messages common to the unmanned vehicle control system 52 and unmanned vehicle as well as translation of messages that may be unique to the unmanned vehicle. As such, the native vehicle specific module 60 may benefit from simulated testing prior to testing with an actual unmanned vehicle.

The unmanned vehicle native link 62 may include any portion of the communication path used to communicate with its associated actual unmanned vehicle. For example, the simulator translator 58 may be configured to transmit and receive messages from the native vehicle specific module 60 using a radio-frequency (RF) portion of the unmanned vehicle native link 62. In another example, the simulator translator 58 may be configured to transmit and receive messages from the native vehicle specific module 60 using internal system calls configured within the operating system of the native vehicle specific module 60.

Figure 3:
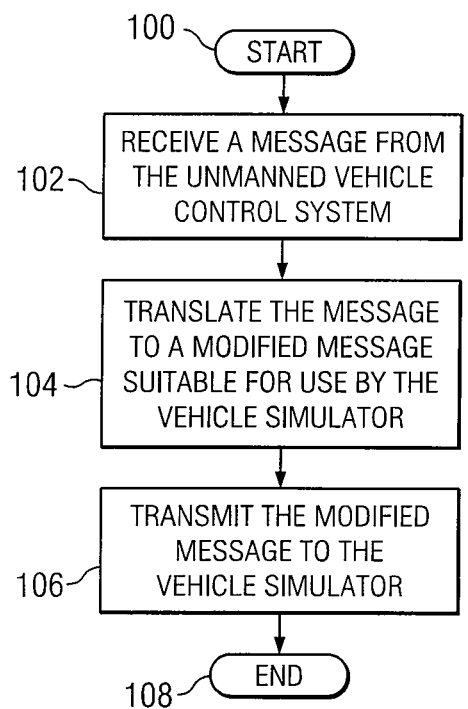
FIG. 3 is a flowchart showing several actions that may be performed by the unmanned vehicle simulation system of FIG. 1 or 2.

FIG. 3 shows one embodiment of a series of actions that may be performed by simulator translator 20 or 58 for simulating operation of an unmanned vehicle using an unmanned vehicle simulation system 10 or 50. In act 100, the simulation process is initiated. The simulation process may be initiated by coupling the simulator translator between unmanned vehicle control system 14 or 52 and vehicle simulator 16 or 56, applying electrical power to the unmanned vehicle control system 14 or 52, vehicle simulator 16 or 56, and simulator translator 20 or 58, and executing any pertinent bootstrapping operations to each of the same.

In act 102, the simulator translator 20 or 58 may receive a message from the unmanned vehicle control system 14 or 52. This message may incorporate any suitable protocol for communicating with an unmanned vehicle 14 or 52. In one embodiment, the message is a STANdardization AGreement 4586 compliant message. The message may include information for administering control or retrieving information from the unmanned vehicle. In one embodiment, the message may include a desired action for the unmanned vehicle to perform, or may include a request for telemetry information from the simulated unmanned vehicle.

In act 104, the simulator translator 20 or 58 may translate the message into a modified message having a protocol suitable for use by the vehicle simulator 16 or 56. In one embodiment, the simulator translator 20 or 58 may translate a single message into a number of messages suitable for use by vehicle simulator 16 or 56. In another embodiment, simulator translator 20 or 58 may translate a number of messages from the unmanned vehicle control system 14 into a single message suitable for use by the vehicle simulator 16 or 56.

In act 106, the simulator translator 20 or 58 may transmit the modified message to the unmanned vehicle simulator 16 or 56. Given this modified message, the vehicle simulator 16 or 56 may take an appropriate simulated action according to information provided in the vehicle model.

The previously described series of actions 102 through 106 may be repeated for each message transmitted from the unmanned vehicle control system 14 to the vehicle simulator 16 or 56. The simulator translator 20 or 58 may also translate messages originating from the vehicle simulator 16 or 56 to the unmanned vehicle control system 14 in a similar manner as described above. Once simulation of the unmanned vehicle using the simulator translator 20 or 58 is no longer needed or desired, the simulator translator 20 or 58 may be halted in act 108.

Several embodiments of an unmanned vehicle message simulation system 10 or 50 have been described that may enable simulation of an unmanned vehicle using a vehicle simulator 16 or 56. The unmanned vehicle message simulation system 10 or 50 may incorporate a commercially available off-the-shelf (COTS) product, such as the FlightGear simulator that is freely available through a General Public license (GPL). The unmanned vehicle simulation system 10 or 50 may provide simulated testing for integration of new unmanned vehicles with an existing unmanned vehicle control system 14 or may enable testing of native vehicle specific modules 60 that are configured to administer control of actual unmanned vehicles.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as they fall within the scope of the appended claims.

What is claimed is:

1. Code embodied in a non-transitory computer readable storage medium, operable, when executed by a computer, to:
   receive at least one first message having a first protocol from an unmanned vehicle control system that is operable to control movement of an unmanned vehicle, the at least one first message comprising a command for a specified movement of the unmanned vehicle;
   translate the at least one first message to at least one second message having a second protocol suitable for use by a vehicle simulator that is operable to simulate movement of the unmanned vehicle, the at least one second message comprising a command for a simulated movement of the unmanned vehicle corresponding to the movement of the unmanned vehicle specified by the command of the at least one first message; and
   transmit the at least one second message to the vehicle simulator to simulate movement of the unmanned vehicle corresponding to the movement of the unmanned vehicle specified by the command of the at least one first message.

2. The code of claim 1, wherein the computer is a vehicle specific module that is operable to translate messages generated by the unmanned vehicle control system into a third protocol suitable for communication with the unmanned vehicle.

3. The code of claim 1, wherein the computer is coupled to the unmanned vehicle control system through an unmanned vehicle native link of a vehicle specific module, the unmanned vehicle native link comprising at least a portion of a communication path used to communicate with the unmanned vehicle.

4. The code of claim 1, further operable to receive at least one third message having the second protocol from the vehicle simulator, translate the at least one third message to at least one fourth message having the first protocol, and transmit the at least one fourth message to the unmanned vehicle control system.

5. The code of claim 1, wherein the code is further operable, when executed by the computer, to determine whether the first control message is to be transmitted to the unmanned vehicle, based on a received input.

6. The code of claim 1, wherein the first protocol is a STANdardization AGreement (STANAG) 4586 protocol.

7. The code of claim 1, wherein the command of the at least one first message comprises one or more of:
   a command to change direction;
   a command to change speed; and
   a command to move to a specified location.

8. The code of claim 1, wherein the vehicle simulator is operable to simulate operation of the unmanned vehicle using a vehicle model having a plurality of editable run-time variables.

9. An unmanned vehicle simulation system comprising:
   a simulator translator coupled between an unmanned vehicle control system that is operable to control movement of an unmanned vehicle and a vehicle simulator that is operable to simulate movement of the unmanned vehicle, the simulator translator operable to:
      receive at least one first message having a first protocol suitable for use by the unmanned vehicle, the at least one first message received from an unmanned vehicle control system, the at least one first message comprising a command for a specified movement of the unmanned vehicle;
      translate the at least one first message having the first protocol to at least one second message having a second protocol suitable for use by a vehicle simulator, the at least one second message comprising a command for a simulated movement of the unmanned vehicle corresponding to the movement of the unmanned vehicle specified by the command of the at least one first message; and transmit the at least one second message to the vehicle simulator to simulate movement of the unmanned vehicle corresponding to the movement of the unmanned vehicle specified by the command of the at least one first message.

10. The unmanned vehicle simulation system of claim 9, wherein the simulator translator is configured in a vehicle specific module, the vehicle specific module being operable to translate messages generated by the unmanned vehicle control system into a third protocol suitable for communication with the unmanned vehicle.

11. The unmanned vehicle simulation system of claim 9, wherein the simulator translator is coupled to the unmanned vehicle control system through an unmanned vehicle native link of a vehicle specific module, the unmanned vehicle native link comprising at least a portion of a communication path used to communicate with the unmanned vehicle.

12. The unmanned vehicle simulation system of claim 9, wherein the simulator translator is further operable to receive at least one third message having the second protocol from the vehicle simulator, translate the at least one third message to at least one fourth message having the first protocol, and transmit the at least one fourth message to the unmanned vehicle control system.

13. The unmanned vehicle simulation system of claim 12, wherein the at least one third message includes telemetry information.

14. The unmanned vehicle simulation system of claim 9, wherein the command of the at least one first message comprises one or more of:
   a command to change direction;
   a command to change speed; and
   a command to move to a specified location.

15. The unmanned vehicle simulation system of claim 9, wherein the first protocol is a STANdardization AGreement (STANAG) 4586 protocol.

16. The unmanned vehicle simulation system of claim 9, wherein the vehicle simulator is operable to simulate operation of the unmanned vehicle using a vehicle model having a plurality of editable run-time variables.

17. A method comprising:
   receiving at least one first message having a first protocol from an unmanned vehicle control system that is operable to control movement of an unmanned vehicle, the at least one first message comprising a command for a specified movement of the unmanned vehicle;
   translating the at least one first message to at least one second message having a second protocol suitable for use by a vehicle simulator that is operable to simulate movement of the unmanned vehicle, the at least one second message comprising a command for a simulated movement of the unmanned vehicle corresponding to the movement of the unmanned vehicle specified by the command of the at least one first message; and
   transmitting the at least one second message to the vehicle simulator to simulate movement of the unmanned vehicle corresponding to the movement of the unmanned vehicle specified by the command of the at least one first message.

18. The method of claim 17, further comprising receiving at least one third message having the second protocol from the vehicle simulator, translate the at least one third message to at least one fourth message having the first protocol, and transmit the at least one fourth message to the unmanned vehicle control system.

19. The method of claim 17, wherein the command of the at least one first message comprises one or more of:
   a command to change direction;
   a command to change speed; and
   a command to move to a specified location.

20. The method of claim 17, wherein the vehicle simulator simulates operation of the unmanned vehicle using a vehicle model having a plurality of editable run-time variables.

* * * * *